United States Patent [19]

Karasick

[11] 4,136,675

[45] Jan. 30, 1979

[54] SOLAR COLLECTOR

[76] Inventor: Norman M. Karasick, 3254 Glendon Ave., Los Angeles, Calif. 90034

[21] Appl. No.: 712,602

[22] Filed: Aug. 9, 1976

[51] Int. Cl.² .............................................. F24J 3/02
[52] U.S. Cl. .................................... 126/271; 126/270
[58] Field of Search ............... 126/270, 271; 237/1 A; 165/166; 29/157.3 R

[56] References Cited

U.S. PATENT DOCUMENTS

| | | | |
|---|---|---|---|
| 991,161 | 5/1911 | McHenry | 126/271 |
| 2,358,476 | 9/1944 | Routh et al. | 126/271 |
| 2,572,972 | 10/1951 | Baldwin | 165/168 |
| 3,193,919 | 7/1965 | Rouse, Jr. | 29/157.3 R |
| 3,239,000 | 3/1966 | Meagher | 126/271 |
| 3,399,664 | 9/1968 | Suhay | 126/271 |
| 3,916,871 | 11/1975 | Estes et al. | 126/271 |
| 3,934,323 | 1/1976 | Ford et al. | 126/271 |
| 3,937,208 | 2/1976 | Katz et al. | 126/271 |
| 3,961,619 | 6/1976 | Estes et al. | 126/271 |
| 3,972,317 | 8/1976 | Gallagher | 126/271 |
| 3,995,615 | 12/1976 | Hojnowski | 126/271 |
| 4,022,272 | 5/1977 | Miller | 29/157.3 R |

FOREIGN PATENT DOCUMENTS 1328372  8/1973  United Kingdom ..................... 126/271

*Primary Examiner*—Kenneth W. Sprague
*Attorney, Agent, or Firm*—Flam & Flam

[57] ABSTRACT

A solar collector comprises a series of absorber modules each formed as an extrusion that forms side-by-side flow channels. In one form of the invention, end plates close the flow channels at their ends, the ribs between the flow channels being cut away at their ends in order to define a sinuous flow path from the outside to the inside of the collector. The absorber modules are supported at the relatively low temperature sides adjacent the inlets, and with conductive engagement only with the bottom wall of the absorber.

19 Claims, 6 Drawing Figures

4,136,675

SOLAR COLLECTOR

FIELD OF INVENTION

This invention relates to a solar collector in which a high percentage of cross-sectional area is utilized without benefit of focusing.

BACKGROUND OF THE INVENTION

The basic problem in the field of solar collectors is operating efficiency which, of course, translates to cost.

Efficiency is measured in terms of energy removed by the transfer medium per unit time, per unit area and per unit radiation. With a low temperature differential between inlet and outlet, high efficiencies are easier to obtain. For example, edge losses at high temperature differentials are a higher percentage of the total energy produced, and efficiencies drop. The primary object of the present invention is to provide a solar collector that has vastly improved efficiency, particularly at useful temperature differentials.

While thermal efficiency of a solar collector is of primary importance in terms of the marginal cost of energy production, there is another significant cost factor, which is the cost of the structure itself. Expensive structures that produce high thermal efficiencies may be no more valuable than a low initial cost, low efficiency unit. Accordingly a companion object of the present invention is to provide a structurally simple, and hence inexpensive, solar collector unit.

SUMMARY OF INVENTION

In order to accomplish the foregoing objective, I provide a novel combination of features that together achieve a high thermal efficiency, particularly at useful temperature differentials.

The collector comprises a series of side-by-side flow channels. Each flow channel is bounded by a common absorber wall at the top and by a common wall at the bottom. Furthermore, adjacent flow channels are separated by a common rib. The collector is made from a multicellular or honeycomb extrusion. The thermal energy created in the absorber wall is effectively transferred to the transfer fluid not only across the inside surface of the absorber wall, but also through the inside surfaces of the ribs. The absence of welds in the extruded collector ensures a low resistance path for thermal energy from the absorber wall to the ribs and to the transfer fluid.

In a preferred form of the present invention, the flow channel or channels at the center connect to the outlet of the collector. The flow channel at the sides are connected to the inlets. By so locating the inlets and outlets a low temperature difference and hence a low thermal loss occurs at the place where the collector is mounted, namely at the outside flow channels.

A third feature of the collector is the manner of attachment to the supporting frame. The attachment is accomplished by fastener means engaging the bottom wall, not the top wall. The bottom wall has a low temperature not only for the reason that it is relatively idle in the flow of thermal energy as compared with the absorber wall, but also, in the preferred form of the invention, by virtue of the outside to inside flow path. Accordingly, there is very little loss through the attachment.

Another feature of the collector is that it is inherently strong, having a high beam strength such that the collector itself can form a wall or roof. Consequently the collector panel can be up to 40 feet long, which is perhaps five times as long as known collector panels. The collector supports its own weight, the frame serving as a means of attachment of the collector to a support.

BRIEF DESCRIPTION OF DRAWINGS

A detailed description of the invention will be made with reference to the accompanying drawings wherein like numerals designate corresponding parts in the several figures. These drawings, unless described as diagrammatic or unless otherwise indicated, are to scale.

DETAILED DESCRIPTION OF PREFERRED EMBODIMENT

The following detailed description is of the best presently contemplated modes of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
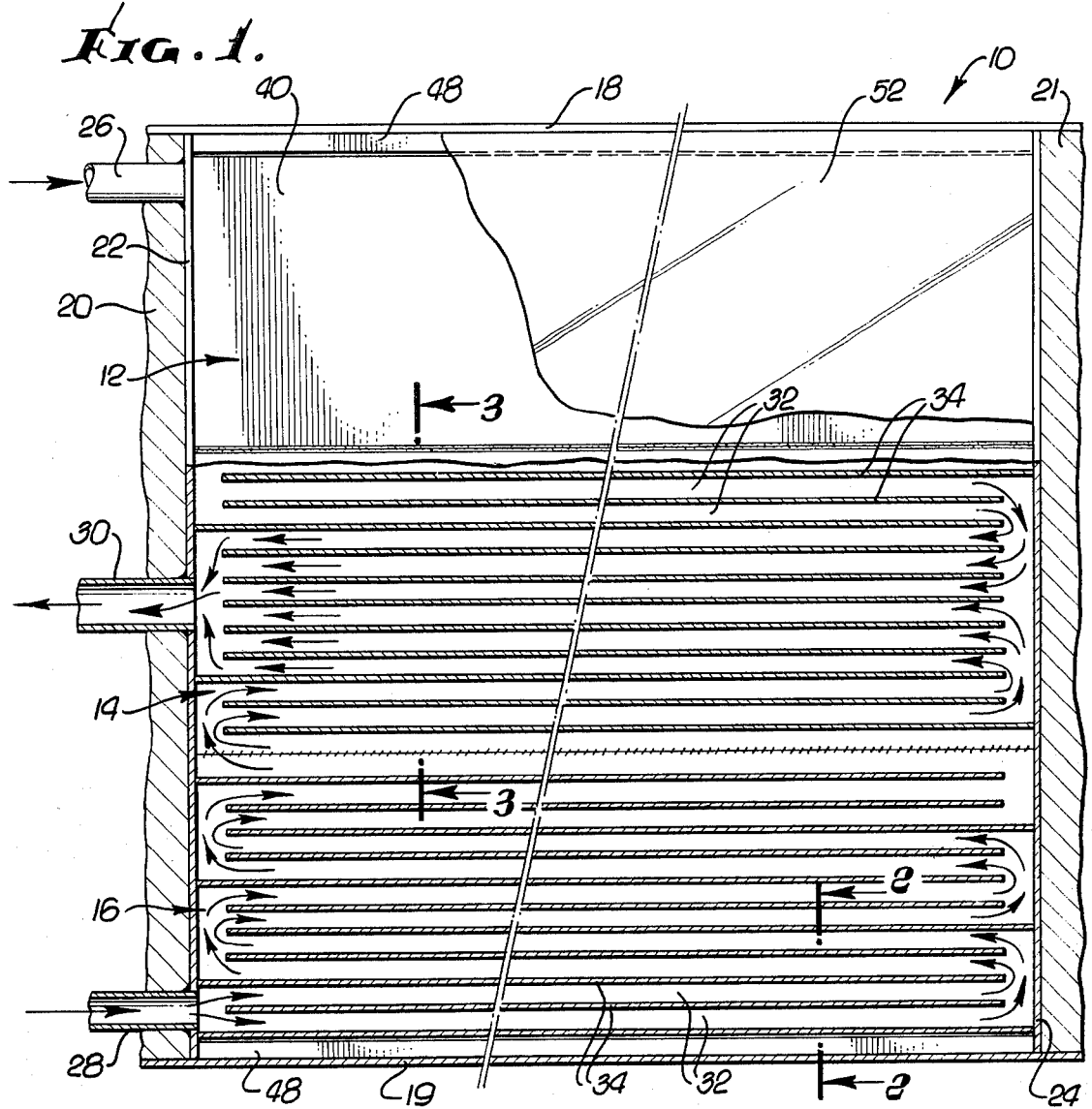
FIG. 1 is a plan view of a solar collector panel incorporating the present invention.

In FIG. 1, there is illustrated a solar collector panel 10 adapted to be affixed to a building side or other support in a manner to expose the collector to solar radiation. The panel 10 comprises a series of absorber modules 12, 14 and 16 made of high conductivity material such as aluminum. The modules are supported peripherally by a rectangular frame structure. The frame structure comprises two side supports 18 and 19 and two end supports 20 and 21 all made of suitable low thermal conductivity material such as wood or plastic. The end supports 20 and 21 are located just outside end members 22 and 24 of the collector.

In the present form, the modules together define two serpentine or sinuous flow paths for the transfer fluid. The paths generally can be traced from two inlets 26 and 28 adjacent the two side supports 18 and 19 respectively at the left hand end of the collector as viewed in FIG. 1. The path from one inlet 26 extends along one side support 18 then back and forth to an outlet 30 located at the center of end support 20. The path from the other inlet 28 extends along the other side support 19 then back and forth to the common outlet 30.

Figure 3:
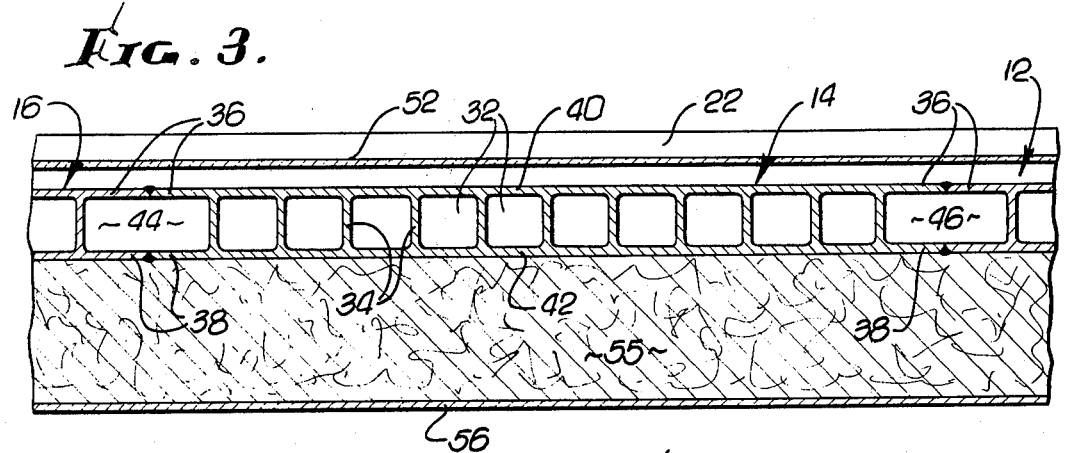
FIG. 3 is an enlarged fragmentary sectional view taken along a plane corresponding to line 3—3 of FIG. 1.

In order to form the flow paths, the individual absorber modules are fabricated in a particular manner. Each module is made as a generally cellular or honeycomb extrusion as shown in FIG. 3. Such an extrusion is available commercially from a subsidiary of Revere Copper and Brass Incorporated of Rome, N.Y. This particular extrusion has 10 enclosed cells and two open cells 32 at the respective sides. Thus the ribs 34 are located to form flanges 36 and 38 at the top absorber wall 40 and the bottom wall 42 respectively. The center module 14 joins the other modules 12 and 16 by having its flanges 36 and 38 respectively abutted to the flanges 36 and 38 of the companion modules. Welding along the abutment integrates the modules. At the region of the welds, flow channels 44 and 46 are formed that have an area substantially equal to twice that of the individual cells. The end members 22 and 24 in the present form are simple plates welded in place at the ends of the cells. The inlets 26 and 28 are welded to the end plate 22.

The two converging flow paths previously defined are in this instance two cells wide at the inlet ends. At the final run where the flow paths merge, the combined paths are six cells wide, such that the terminal velocity is reduced approximately one third. The fluid thus dwells at the region of maximum thermal efficiency and velocity is increased at the outside edges where thermal losses tend to be a problem. The apparent length of the run at the sides as compared with the apparent run length at the center is shortened. In order to form the sinuous flow paths, some of the ribs at the ends of the modules are partially removed and as shown in FIG. 1. Thus the second, third and fourth ribs are removed at the right hand end, forming a flow path two cells wide from the inlet 26 at the left to the right hand end, and then back to the left hand end, etc. The end supports 22 and 24 close the ends of the flow channels. The flow paths are indicated by arrows. Passage of fluid around cut ribs creates just enough turbulence to prevent a thermal stack in the flow channels that would otherwise burden the thermal flow from the collector.

Figure 2:
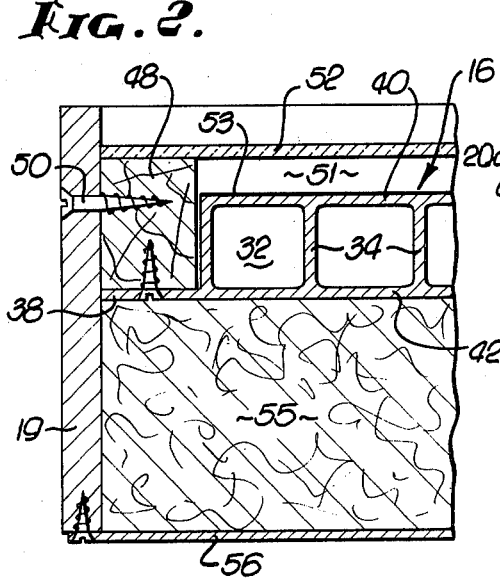
FIG. 2 is an enlarged fragmentary sectional view taken along a plane corresponding to line 2—2 of FIG. 1.

The collector is supported at the sides in a manner shown in FIG. 2. The outside bottom flange 38 of the outside module 16 extends beneath a beam 48. The beam 48 extends upwardly beyond the level of the absorber wall 40. The top flange 36 of the outside module 16 is removed. The beam 48 in turn is attached to the inside of the side support 20, as by screws 50. The upper surface of the beam 48, with its counterpart on the opposite side of the collector, support a typical diathermic cover plate 52 that provides the conventional closed air space 51 above the absorber wall 40. A conventional absorptive coating 53 such as BLACK VELVET (trademark of 3M) is applied to the upper surface of the absorber wall. Thermal insulation sheet material 55 underlies the bottom wall 42 of the modules. A lower cover plate 56 encloses the insulation material 55 and is attached to the under surface of the side supports.

A thermally efficient collector is provided by the simple structure thus described. The transfer fluid in the flow channels surrounded by wall structures are formed as a unit, that is, in one piece with the absorber wall 40. No welds impede thermal flow. The two welds where modules are joined are symmetrically located at the center of a flow channel. Hence these welds are not in the path of thermal flow and correspondingly do not impede the flow of thermal energy.

By supporting the collector independently of the absorber wall 40, thermal losses at the sides is minimized. Furthermore, the edge to center orientation of flow paths effectively isolates the high temperature region of the collector from regions of thermal leakage. The relatively increased flow rate at the sides enhances the effect.

Figure 4:
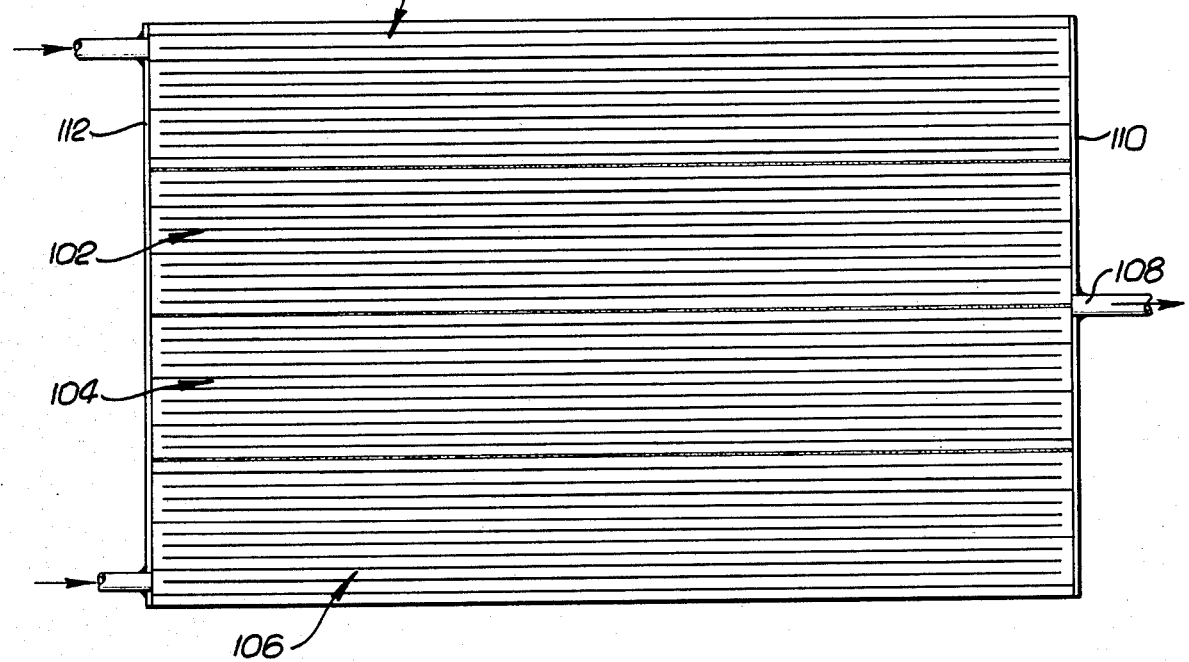
FIG. 4 is a plan view similar to FIG. 1, but illustrating modified forms of the solar collector panel.

In the form illustrated in FIG. 4, there are four side-by-side modules 100, 102, 104 and 106. In the present instance, the outlet 108 is located at the center of one end support 110 while the inlets are located at opposite sides of the opposite end support 112.

Figure 5:
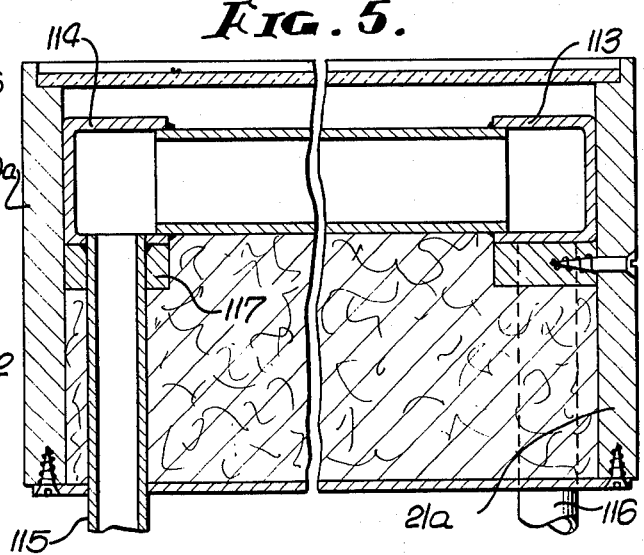
FIG. 5 is a longitudinal sectional view of another modified form of the present invention.
Figure 6:
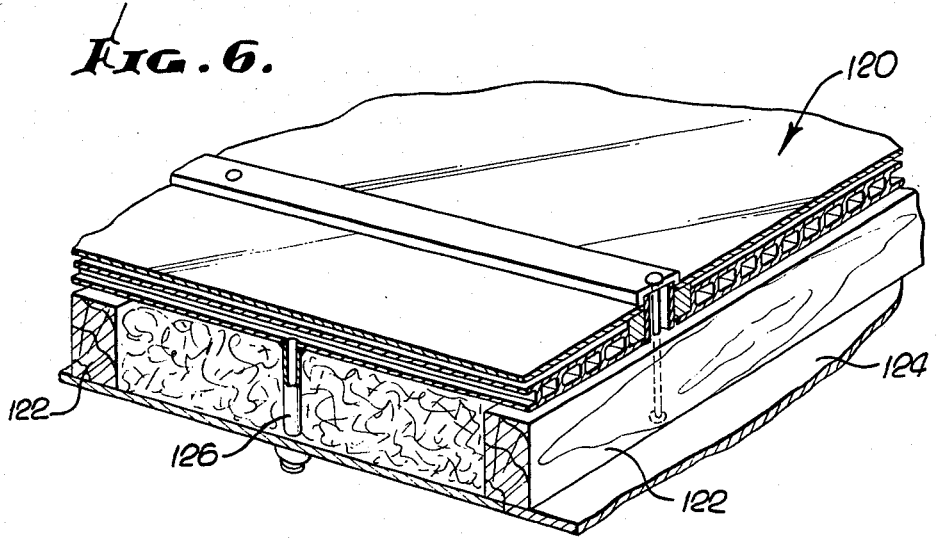
FIG. 6 is a sectional view similar to FIG. 3 but illustrating still another modified form of the present invention.

In the form of the invention illustrated in FIG. 5, the flow channels are connected together in a manner to provide a flow path from one end to the other. For this purpose, the end members 113 and 114, instead of being simple plates as in the form of FIGS. 1–3, are hollow manifolds. An inlet fitting 115 is provided for the manifold 113 at one end and an outlet fitting 116 is provided for the manifold 114 at the opposite end. While outer end supports 20a and 21a are provided like the supports 20 and 21, the manifolds are primarily supported by cleats 117 attached to the side supports. In the form illustrated in FIG. 6, the collector 120 is shown as forming a structural roof element. The collector is one of many supported between a series of spaced rafters 122. The lower cover plate 124 forms the ceiling of a structure. Fuse plugs 126 tap into the flow channels, thus making the transfer fluid available as an emergency fire extinguisher.

Intending to claim all novel, useful and unobvious features shown or described, I make the following claims:

1. In a solar collector:
   a. extruded absorber means made of high thermal conductivity structural material having a top wall to be exposed to solar radiation, and having a series of side-by-side flow channels separated by a series of ribs substantially all of which extend from said top absorber wall;
   b. a bottom wall for said flow channels;
   c. end members attached to said absorber means and closing the ends of said flow channels;
   d. some of the ribs being cut away adjacent the end members in order to define a serpentine path for transfer fluid in an ultimate direction transverse to the flow channels;
   e. each rib being formed in one piece with said top absorber wall whereby a low thermal impedance path free of welds is provided for efficient transfer of thermal energy to the transfer of fluid; and
   f. supporting means connected to opposite sides of said absorber means for suspending said absorber means, said ribs adding structural strength to said absorber means sufficient to resist excessive deflection under load.

2. The solar collector as set forth in claim 1 together with means forming inlets to said collector at the sides of said absorber means; means forming an outlet at the center of said absorber means whereby the temperature differential at the location of the supporting means is minimized for increase of thermal efficiency.

3. In a solar collector:
   a. extruded absorber means made of high thermal conductivity material having a series of side-by-side flow channels separated by a series of ribs extending from a common absorber wall;
   b. end members attached to said absorber means and closing the ends of said flow channels;
   c. some of the ribs being cut away adjacent the end members in order to define a serpentine path for transfer fluid in an ultimate direction transverse to the flow channels;
   d. each rib being formed as a unit with its companion absorber wall whereby a low thermal impedance path free of welds is provided for efficient transfer of thermal energy to the transfer fluid;

e. means forming inlets to said collector at the sides of said absorber means;

f. means forming an outlet at the center of said absorber means;

g. means supporting said absorber means at the sides whereby the temperature differential at the location of the supporting means is minimized for increase of thermal efficiency;

h. said flow path having a greater effective cross-sectional area at the center than at the sides whereby the flow rate of the transfer fluid adjacent the location of the supporting means is relatively increased for increase of thermal efficiency.

4. In a solar collector:

a. extended absorber means having a series of side-by-side cells forming substantially parallel flow channels separated by a series of ribs extending between a common absorber wall on the top and a common bottom wall;

b. end plates attached to the absorber means and closing the ends of said flow channels;

c. some of the ribs being cut away adjacent the end plates in order to define a sinuous flow path for transfer fluid in the absorber means, and which flow path has an ultimate direction transverse to the flow channels;

d. each rib being formed in one piece with the top absorber wall whereby a low thermal impedance path substantially free of welds is provided for efficient transfer of thermal energy to the transfer fluid; and e. supporting means connected to opposite sides of said absorber means for suspending said absorber, said ribs adding structural strength to said absorber means sufficient to resist excessive deflection under load.

5. The combination as set forth in claim 4 in which said supporting means attach to said bottom wall at the sides of said absorber means whereby the thermal conduction path of thermal energy from the absorber to the supporting means is dependent upon said bottom wall.

6. In a solar collector:

a. extruded absorber means having a series of side-by-side cells forming substantially parallel flow channels separated by a series of ribs extending between a common absorber wall on the top and a common bottom wall;

b. end plates attached to the absorber means and closing the ends of said flow channels;

c. some of the ribs being cut away adjacent the end plates in order to define a sinuous flow path for transfer fluid in the absorber means, and which flow path has an ultimate direction transverse to the flow channels;

d. each rib being formed as a unit with its companion absorber wall whereby a low thermal impedance path substantially free of welds is provided for efficient transfer of thermal energy to the transfer fluid;

e. said bottom wall being extended laterally of said flow channels at the sides of said absorber means; and f. beams extending along the sides of said absorber means, the laterally extended portions of said bottom wall being attached to the under surfaces of said beams.

7. The combination as set forth in claim 6 together with means forming inlets to said collector at the sides of said absorber means; and means forming an outlet at the center of said absorber means.

8. The combination as set forth in claim 7 in which said flow path of transfer fluid has a greater effective cross sectional area at the center than at the sides whereby the flow rate of the transfer fluid adjacent the location of the supporting beams is relatively increased for increased thermal efficiency.

9. In a solar collector:

a. a plurality of spaced beams;

b. a plurality of solar collectors fitting between the beams to form a building structure therewith; each of said solar collectors comprising;

i. extruded absorber means having a series of side-by-side flow channels separated by a series of ribs all extending from a top absorber wall, each rib being formed in one piece with said top absorber wall whereby a low thermal impedance path is provided for efficient transfer of thermal energy to the flow channels;

ii. end members attached to said absorber means and closing the ends of said flow channels;

iii. diathermic sheet material overlying the absorber means and supported by said beams; and c. means connected to opposite side of said absorber means for supporting said absorber means on said beams, said ribs adding structural strength to the absorber means sufficient to resist excessive deflection.

10. In a solar collector:

a. a plurality of spaced beams:

b. a plurality of solar collectors fitting between the beams to form a building structure therewith; each of said solar collectors comprising:

i. extruded absorber means having a series or ribs extending from a common absorber wall, each rib being formed as a unit with its companion absorber wall whereby beam strength is imparted to said collector and whereby a low thermal impedance path is provided for efficient transfer of thermal energy to the flow channels;

ii. diathermic sheet material overlying the absorber means and supported by said beams;

c. thermal insulation material underlying said absorber means; and d. thermal fuse plugs exposed beneath said thermal insulation material and connected to said flow channels whereby the transfer fluid in said flow channels is available for fire abatement.

11. In a solar collector:

a. a series of side-by-side absorber modules, each absorber module being a cellular extrusion providing a number of side-by-side cells defining flow channels separated by a series of ribs, said ribs extending between a common absorber wall on the top and a common bottom wall on the bottom;

b. means securing the modules in side-by-side relationship;

c. end members at the ends of the flow channels;

d. some of the ribs being cut away adjacent the end members to define serpentine paths for transfer fluid in the channels, the paths having an ultimate direction transverse to the flow channels;

e. means forming inlets at the flow channels on opposite sides of the collector;

f. means forming an outlet near the center of the collector.

12. The combination as set forth in claim 11 together with means for supporting the collector so that the thermal losses by conduction exist only at the sides.

13. The combination as set forth in claim 11 together with means supporting the collector at the sides and from the bottom portion of the collector.

14. The combination as set forth in claim 13 in which the cut away ribs determine a flow path having a smaller cross sectional area at the sides than at the center for increased flow rate at the sides.

15. The combination as set forth in claim 11 in which said modules have flanges at the sides forming initially open flow channels, the flanges of adjacent modules being welded together and the flanges at the bottom wall of the outside modules being attached to a support.

16. In a solar collector:
   a. structural extruded absorber means of metal or metal-like material having high thermal conductivity, said absorber means having a series of side-by-side flow channels separated by a series of ribs extending from a common absorber wall;
   b. end members attached to said absorber means and located at the ends of said flow channels;
   c. end rib being formed in one peice with its companion absorber wall whereby a low thermal impedance path free of welds is provided for efficient transfer of thermal energy to the transfer fluid in the flow channels; and
   d. supporting means connected to opposite sides of same absorber means for suspending said absorber means, said ribs adding structural strength to the absorber means sufficient to resist excessive deflection.

17. The collector as set forth in claim 16 in which said end members are manifolds, and inlet and outlet members at the manifolds respectively.

18. The collector as set forth in claim 16 in which said extruded absorber means has a bottom wall formed as a unit therewith.

19. The collector as set forth in claim 16 in which said extruded absorber means has a bottom wall formed as a unit therewith, and beams extending along the sides of said absorber means, the bottom wall having laterally extended portions attached to said beams whereby the flow of thermal energy to said beam is dependent upon the said bottom wall.

* * * * *